United States Patent
Wu et al.

(10) Patent No.: US 10,571,245 B2
(45) Date of Patent: Feb. 25, 2020

(54) GRATING MEASUREMENT APPARATUS

(71) Applicant: SHANGHAI MICRO ELECTRONICS EQUIPMENT (GROUP) CO., LTD., Shanghai (CN)

(72) Inventors: Ping Wu, Shanghai (CN); Zhiping Zhang, Shanghai (CN)

(73) Assignee: SHANGHAI MICRO ELECTRONICS EQUIPMENT (GROUP) CO., LTD., Shanghai (CN)

(*) Notice: Subject to any disclaimer, the term of this patent is extended or adjusted under 35 U.S.C. 154(b) by 0 days.

(21) Appl. No.: 16/321,580

(22) PCT Filed: Jul. 27, 2017

(86) PCT No.: PCT/CN2017/094612
§ 371 (c)(1),
(2) Date: Jan. 29, 2019

(87) PCT Pub. No.: WO2018/019264
PCT Pub. Date: Feb. 1, 2018

(65) Prior Publication Data
US 2019/0310072 A1 Oct. 10, 2019

(30) Foreign Application Priority Data
Jul. 29, 2016 (CN) .......................... 2016 1 0614519

(51) Int. Cl.
*G01B 11/02* (2006.01)
*G01B 9/02* (2006.01)

(52) U.S. Cl.
CPC .......... *G01B 11/02* (2013.01); *G01B 9/02007* (2013.01); *G01B 2290/20* (2013.01); *G01B 2290/30* (2013.01); *G01B 2290/70* (2013.01)

(58) Field of Classification Search
CPC .... G01B 11/02; G01B 11/14; G01B 9/02007; G01B 2290/20; G01B 2290/30; G01B 2290/70; G01D 5/347; G01D 5/34746
See application file for complete search history.

(56) References Cited

U.S. PATENT DOCUMENTS 4,804,270 A 2/1989 Miller et al.
7,362,446 B2 4/2008 Van Der Pasch et al.
(Continued)

FOREIGN PATENT DOCUMENTS

CA 2576978 A1 3/2006
CN 102906545 A 1/2013
(Continued)

*Primary Examiner* — Jonathan M Hansen (57) ABSTRACT

A grating measuring device includes: a light source module (300) for generating two light beams having different frequencies, one of which serves as a measuring beam and the other as a reference beam; a grating (200); and a grating measuring probe (100) including a dual-frequency light reception module, a vertical measurement module, a vertical detection module and a reference detection module. The dual-frequency light reception module is configured to receive the measuring and reference beams, and the vertical measurement module is adapted to project the measuring beam onto the grating (200), collect a zeroth-order diffracted beam resulting from double diffraction occurring at the grating, and feed the zeroth-order diffracted beam to the vertical detection module. The zeroth-order diffracted beam interferes with the reference beam in the vertical detection module, resulting in a vertical interference signal. In addition, the measuring and reference beams interfere with each other also in the reference detection module to result in a reference interference signal. The vertical and reference interference signals are received by a signal processing module and serve as a basis for calculating a vertical displacement of the grating (200). This grating measuring (Continued)

device allows a great vertical displacement measurement range at any working distance.

18 Claims, 4 Drawing Sheets

(56) References Cited

U.S. PATENT DOCUMENTS

| | | | |
|---|---|---|---|
| 7,389,595 | B2 | 6/2008 | Meissner et al. |
| 8,300,233 | B2 | 10/2012 | Deck et al. |
| 2012/0194824 | A1* | 8/2012 | de Groot ............ G01B 9/02003 356/482 |
| 2013/0114087 | A1* | 5/2013 | Deck .................... G01B 9/0209 356/486 |
| 2017/0350689 | A1* | 12/2017 | Matsushita .............. G01D 5/00 |

FOREIGN PATENT DOCUMENTS

| | | |
|---|---|---|
| CN | 102937411 A | 2/2013 |
| CN | 102944176 A | 2/2013 |
| CN | 103644848 A | 3/2014 |
| CN | 104567695 A | 4/2015 |
| CN | 104567696 A | 4/2015 |
| CN | 104596424 A | 5/2015 |
| TW | I-239385 | 9/2005 |

\* cited by examiner

GRATING MEASUREMENT APPARATUS

TECHNICAL FIELD

The present invention relates to the fabrication of integrated circuits (ICs) and, in particular, to a grating measuring device.

BACKGROUND

Nanometric metrology is the foundation of many applications such as nanofabrication, nanomanipulation and nanomaterials. IC, precision machinery, micro-electromechanical system (MEMS) and many other industries all require high-resolution, high-precision displacement sensors for nanopositioning. With the fast development of ICs toward large-scale and high-integration ones, the requirements on overlay accuracy of photolithography tools and hence on accuracy of six-degree-of-freedom (6-DOF) position information of wafer and mask stages are becoming more and more demanding.

Interferometers have been employed in photolithography systems to measure positions of wafer and mask stages due to their high measurement precision of nanoscale. However, existing interferometers are almost at their precision limit and suffer from susceptibility of their precision to surroundings, low measurement repeatability and errors typically exceeding 1 nm even in good ambient conditions. Therefore, it is difficult for traditional interferometer-based measurement system to meet the still-increasing overlay precision demands, and there is an urgent need for high-precision solutions allowing measurements on the order of picometers with high consistency.

Grating-based measurement systems operate with good repeatability while not being affected by surroundings much. They are increasingly replacing interferometers in the most recent photolithography systems to perform precise, stable measurements on the order of picometers. U.S. Published Patent Application No. U.S. Pat. No. 7,389,595 proposes a two-dimensional grating-based measurement system based on fiber optic transmission of light from a light source and that carrying detection signals. In this solution, the light source is a semiconductor laser, and a displacement of the grating relative to a read head is measured in a homodyne manner. However, such homodyne detection is vulnerable to interference, and the collected position data are susceptible to external stray light, electromagnetic fields and vibration. Chinese Patent Application No. CN201210449244.9 proposes a dual-band heterodyne grating-based measurement system providing effectively increased measurement precision. However, only detection signals are transferred by fiber transmission, with a laser light source and a grating reading head being integrated to lead to a bulky structure, making it unsuitable for use in tight space applications. Moreover, when there is any Rx/Ry angular offset between the grating and the read head, the interferometric performance of the measurement system will be degraded, leading to failure of the system. Further, due to very high complexity in assembling and commissioning of the grating and the reading head, this system does not allows ease of installation and use.

U.S. Published Patent Application No. U.S. Pat. No. 8,300,233B2 proposes a grating-based measurement system in which a light beam is perpendicularly incident on a grating and a corner reflector reflects the resulting diffracted beams back for determination of two-dimensional position data in horizontal and vertical directions. Limited to the structure of the corner reflector, any vertical relative displacement between the grating and a probe will cause a deviation between reference and measuring spots formed on a receiver, and in case of complete separation between the reference and measuring spots, optical interference will be impossible. Therefore, limited by the spot size, this measurement system suffers from a small vertical measurement range between the grating and the probe.

SUMMARY OF THE INVENTION

The present invention aims to provide a grating measuring device allowing a great vertical displacement measurement range at any working distance.

To this end, the present invention provides a grating measuring device for measuring a displacement of a grating, including:

a light source module for generating two light beams having different frequencies, one of the two light beams serving as a measuring beam and the other one serving as a reference beam;

a grating measuring probe including a dual-frequency light reception module, a vertical measurement module, a vertical detection module and a reference detection module, wherein the dual-frequency light reception module is configured to receive the measuring beam and the reference beam, project the measuring beam onto the vertical measurement module and the reference detection module, and project the reference beam onto the vertical detection module and the reference detection module, wherein the vertical measurement module projects the measuring beam onto the grating, collects a zeroth-order diffracted beam resulting from double diffraction at the grating, and projects the zeroth-order diffracted beam to the vertical detection module, wherein the zeroth-order diffracted beam interferes with the reference beam in the vertical detection module, thereby forming a vertical interference signal, and wherein the measuring beam interferes with the reference beam in the reference detection module, thereby forming a reference interference signal; and a signal processing module configured to receive the vertical interference signal and the reference interference signal and calculate a vertical displacement of the grating.

Preferably, the light source module may include a laser, an isolator, a beam-splitter, frequency shifters, a first coupler and a second coupler, wherein a laser beam emanated from the laser passes through the isolator and is split by the beam-splitter into two beams which are then modified by the frequency shifters to have different frequencies, respectively coupled by the first and second couplers and fed to the grating measuring probe.

Preferably, the laser beam emanated from the laser may have a wavelength of 400-1500 nm.

Preferably, each of the frequency shifters may be a Zeeman frequency splitting element, a birefringent element or two acousto-optic frequency shifters.

Preferably, the grating may be a one-dimensional grating or a two-dimensional grating.

Preferably, the vertical measurement module may include a polarization beam splitter, a corner reflector and a polarization controller, wherein after transmitting through the polarization beam splitter, the measuring beam is rotated in polarization by the polarization controller and diffracted at the grating, wherein a zeroth-order diffracted beam resulting from the diffraction is rotated in polarization again by the polarization controller, reflected by the polarization beam splitter, reflected by the corner reflector back to the polarization beam splitter and irradiated onto the grating so that a second diffraction takes place, and wherein a zeroth-order diffracted beam resulting from the second diffraction passes through the polarization beam splitter and finally reaches the vertical detection module.

Preferably, the polarization controller may be a Faraday rotator or a half wave plate.

Preferably, the dual-frequency light reception module may include a first beam-splitting prism and a second beam-splitting prism, wherein the vertical detection module includes a vertical measurement coupler, wherein the measuring beam is split by the first beam-splitting prism into a first measuring component and a second measuring component, the first measuring component being projected onto the grating through the vertical measurement module, the second measuring component being projected to the reference detection module, and wherein the reference beam is split by the second beam-splitting prism into a first reference component and a second reference component, the first reference component being coupled by the vertical measurement coupler with a light beam resulting from the first measuring component that has passed through the vertical measurement module, the second reference component being projected to the reference detection module.

Preferably, the dual-frequency light reception module may include a first beam-splitting prism and a second beam-splitting prism, wherein the vertical detection module includes a vertical measurement coupler and a third beam-splitting prism, wherein the measuring beam is split by the first beam-splitting prism into a first measuring component and a second measuring component, the first measuring component being projected to the grating by the vertical measurement module, the second measuring component being projected to the reference detection module, wherein the reference beam is split by the second beam-splitting prism into a first reference component and a second reference component, the first reference component passing through the third beam-splitting prism and being then coupled by the vertical measurement coupler with a light beam resulting from the first measuring component that has passed through the vertical measurement module, the second reference component being projected to the reference detection module.

Preferably, the grating measuring device may further include a plurality of reflective components for deflecting and relaying the light beams.

Preferably, the dual-frequency light reception module may further include a first collimator, a second collimator and a pair of wedge-shaped plates, wherein the measuring beam is collimated and angularly controlled by the first collimator and the pair of wedge-shaped plates, and wherein the reference beam is collimated by the second collimator.

Preferably, the light source module (300) may be connected to the grating measuring probe by polarization-maintaining fiber optics.

Preferably, the polarization of the measuring beam may be oriented at a first angle with respect to that of the reference beam, wherein accordingly, the polarization beam splitter is placed obliquely at the first angle and the polarization controller rotates the polarizations of the light beams by the first angle.

Preferably, the first angle may be 45 degrees.

Preferably, the polarization of the light beam incident on a surface of the grating may be oriented at a second angle with respect to a direction of periodicity of the grating.

Preferably, the second angle may be (45+k*90) degrees, where k is a natural number.

Preferably, the vertical detection module may be connected to the signal processing module by a multiple-mode fiber optic.

Preferably, the reference detection module may be connected to the signal processing module by a multiple-mode fiber optic.

Compared to the prior art, the present invention offers the following advantages:

1. It features all-fiber optic transmission, high resilience to interference, high measurement precision, high measurement repeatability, absence of nonlinear errors, structural simplicity and ease of use and installation and is ideal for applications that demand highly stable multidimensional measurements on the order of picometers.

2. The horizontal measurement module in the grating measuring device of the invention is able to measure a horizontal displacement based on two light beams and can detect an optical signal indicative of the horizontal displacement and a reference optical signal. Moreover, it can perform two-dimensional horizontal measurements both in the X and Y directions with a single system configuration, thus effectively reducing measurement errors, lowering the size and cost of the grating and making the grating measuring probe more compact with a smaller footprint.

3. Using the zeroth-order diffracted beam from the grating enables the inventive device to measure any vertical displacement without being limited by the light spot size.

4. It effectively combines measurements in the horizontal (X/Y) and vertical (Z) directions to entail a multi-axis approach. Moreover, the vertical (Z) measurement relies on the zeroth-order diffracted beam that is not involved in the horizontal measurements. This enhances the energy utilization of the grating measuring system, i.e., allowing measurement in more directions while not requiring higher incident optical power.

5. According to the invention, a highly integrated three-axis or multi-axis read head can be obtained suitable for use in multi-axis measurement and control systems for motions stages which are space- and size-sensitive and requires very high measurement precision and repeatability.

6. It allows dual-band heterodyne grating measurements based on all-fiber transmission.

7. The gas laser used as the light source allows for a long coherence length and thus ensures effective interference even at a considerable tilt or inclination of the grating relative to the grating measuring probe.

8. According to the present invention, the laser light source is separated from the grating measuring probe. This allows the grating measuring probe to be made compact and suitable for use in application with tight space.

9. Using the beams at different frequencies results in higher stability, higher resilience to interference and better measurement accuracy and repeatability.

In these figures,
100—grating measuring probe;
111—first collimator; 112—second collimator; 113—a pair of wedge-shaped plates;
121—polarization beam splitter; 122—corner reflector; 123—polarization controller;
131—first beam-splitting prism; 132—second beam-splitting prism; 133—third beam-splitting prism; 134—fourth beam-splitting prism; 135—first remote coupler; 136—second remote coupler; 137—first mirror; 138—second mirror; 139—third mirror; 13a—fourth mirror; 13b—fifth beam-splitting prism;
141a, 141b—first corner reflector;
153—first polarization beam splitter; 154—third remote coupler; 155—fourth remote coupler;
200—grating;
300—light source module; 301—laser; 302—isolator; 303—beam-splitting prism; 304—mirror; 305—first frequency shifter; 306—second frequency shifter; 307—first coupler; 308—second coupler;
401, 402—polarization-maintaining fiber optic; 403, 404, 405, 406—multiple-mode fiber optic;
501, 502, 503, 503a, 503b, 504, 505, 506—light beam.

DETAILED DESCRIPTION

Particular embodiments of the present invention will be described in detail below with reference to the accompany drawings so that the above objects, features and advantages thereof will become more apparent and readily understood. Note that the accompanying drawings are provided in a very simplified form not necessarily presented to scale, with the only intention of facilitating convenience and clarity in explaining the embodiments.

Embodiment 1

Figure 1:
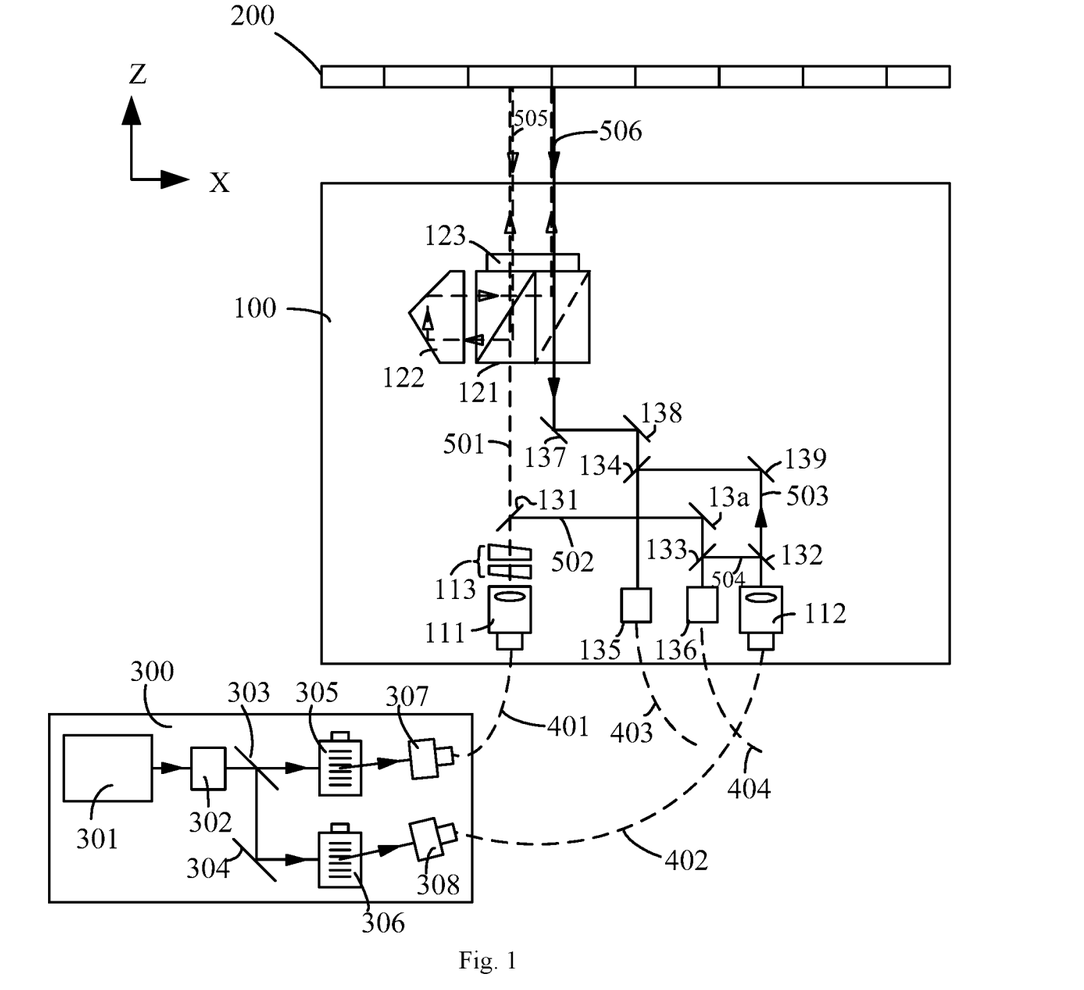
FIG. 1 is a structural schematic of a grating measuring device according to Embodiment 1 of the present invention.

As shown in FIG. 1, a grating measuring device according to this Embodiment is intended to measure a displacement of a grating 200 and includes:
a light source module 300 for generating two light beams of different frequencies, respectively referred hereinafter to as, for the purpose of discrimination therebetween, a measuring beam and a reference beam;
a first detector;
a second detector; and
a grating measuring probe 100, including a dual-frequency light reception module, a vertical detection module, a vertical measurement module and a reference detection module. The dual-frequency light reception module is configured to receive the measuring and reference beams, direct the measuring beam onto the vertical measurement module and the reference detection module, and direct the reference beam onto the vertical detection module and the reference detection module. The vertical measurement module projects the measuring beam onto the grating 200, collects a zeroth-order diffracted beam resulting from double diffraction occurring at the grating 200 and projects the zeroth-order diffracted beam onto the vertical detection module. The zeroth-order diffracted beam interferes with the reference beam within the vertical detection module, resulting in a vertical interference signal which is then detected by the first detector. Meanwhile, a reference interference signal resulting from interference between the measuring and reference beams occurring within the reference detection module is detected by the second detector. The device further includes a signal processor which receives, and calculates the vertical displacement of the grating 200 based on, the vertical and reference interference signals.

With continued reference to FIG. 1, the light source module 300 includes a laser 301, an isolator 302, a beam-splitter, frequency shifters and couplers. The beam-splitter includes a beam-splitting prism 303 and a mirror 304.

The laser 301 is adapted to emit laser light of any wavelength within the range of 400 nm to 1500 nm such as, for example, 633 nm, 780 nm or 980 nm. Further, the laser 301 is provided with a wavelength monitoring system for monitoring any change in the laser 301 and counteracting such changes. Further, the laser 301 may be implemented as a gas laser, such as a helium-neon (HeNe) laser, featuring an extremely narrow linewidth and good frequency stability. The laser light from the laser 301 is a linearly polarized beam. The polarized beam may be a P- or S-polarized beam.

The isolator 302 is disposed at the exit of the laser 301 to block return reflections. The isolator 302 may be replaced by a slanted fiber end face which can also reduce the influence of return reflections. The isolator 302 or slanted fiber end face disposed at the laser 301 allows the laser 301 to operate in a more stable way.

The frequency shifters can be implemented as acousto-optic frequency shifters, electro-optic frequency shifters, Zeeman frequency splitting elements or birefringent elements. In this embodiment, acousto-optic frequency shifters are preferred, and two frequency shifters and two couplers are included, respectively referred hereinafter to as, for the purpose of discrimination therebetween, first and second frequency shifters 305, 306 and first and second couplers 307, 308. Light emanated from the laser 301 is split by the beam-splitting prism 303 into two beams, one of which is frequency-shifted by a desired amount by the first frequency shifter 305 and then output by the first coupler 307 as the measuring beam, and the other is reflected by the mirror 304 into the second frequency shifter 306, frequency-shifted thereby by a different amount and output by the second coupler 308 as the reference beam.

Further, the light beams with a frequency difference therebetween, i.e., the measuring and reference beams, may be remotely transmitted to the grating measuring probe 100 via polarization-maintaining fiber optics 401, 402.

With continued reference to FIG. 1, the dual-frequency light reception module includes a first collimator 111, a second collimator 112 and a pair of wedge-shaped plates 113. The pair of wedge-shaped plates 113 is disposed in positional correspondence with the first collimator 111. The measuring beam is collimated and angularly controlled by both the first collimator 111 and the pair of wedge-shaped plates 113. The reference beam is collimated by the second collimator 112. The pair of wedge-shaped plates 113 controls relative parallelism between the measuring and reference beams. The dual-frequency light reception module further includes a first beam-splitting prism 131 and a second beam-splitting prism 132. The vertical detection module includes a first remote coupler 135, and the reference detection module includes a second remote coupler 136 and a third beam-splitting prism 133.

The measuring beam is split by the first beam-splitting prism 131 into two measuring components, one measuring component 501 of which is guided by the vertical measurement module onto the grating 200, and the other measuring component 502 is fed to the reference detection module.

The reference beam is split by the second beam-splitting prism 132 into two reference components, one reference component 503 of which is coupled to the measuring component exiting the vertical measurement module (i.e., the aforementioned zeroth-order diffracted beam resulting from double diffraction) by the vertical detection module (more specifically, the first remote coupler 135), and the other reference component 504 is directed into the reference detection module. Specifically, it is reflected by the third beam-splitting prism 133 onto the second remote coupler 136.

With continued reference to FIG. 1, the vertical measurement module includes a polarization beam splitter 121, a corner reflector 122 and a polarization controller 123. The polarization beam splitter 121 consists of beam-splitting prisms arranged side-by-side along the X-direction as shown in the figure. It is to be noted that the optical paths shown in the figures may not be drawn exactly as they actually are and are presented for the only purpose of illustrating how the light beams propagate and are redirected. For example, any two actually coincident optical paths are deliberately depicted as separate lines in the figures in order for a clearer understanding of the present invention to be obtained. Therefore, the schematic representations of the optical paths in the accompanying drawings shall not be construed as limiting the present invention in any sense.

The measuring component 501 resulting from the splitting of the measuring beam by the first beam-splitting prism 131 is incident on the polarization beam splitter 121 along the +Z direction and transmits through the polarization beam splitter 121. After its polarization is rotated by the polarization controller 123, the component is incident on the grating 200 and experiences a diffraction thereon. A zeroth-order diffracted beam 505 from the diffraction propagates along the −Z direction back to the polarization controller 123 so that its polarization is also rotated. The polarization-modified light beam is reflected by the polarization beam splitter 121 onto the corner reflector 122 which, in turn, reflects the beam back to the polarization beam splitter 121 so that the beam again propagates along the +Z direction onto the grating 200 (see the optical path indicated by dashed lines) and is diffracted thereby for another time. A zeroth-order diffracted beam 506 resulting from the second diffraction travels back along the −Z direction, passes through the polarization beam splitter 121 and finally reaches the vertical detection module.

The polarization controller 123 may be implemented as a Faraday rotator or a half wave plate. The grating 200 may be implemented as a one-dimensional grating or a two-dimensional grating. The grating 200 may be implemented as a sinusoidal, rectangular or zigzag pattern.

With continued reference to FIG. 1, the vertical detection module further includes a first mirror 137 and a second mirror 138, both disposed between the vertical measurement module and the first remote coupler 135 and configured to guide the zeroth-order diffracted light beam 506 exiting the vertical measurement module onto the first remote coupler 135, a third mirror 139 for deflecting the reference component 503, and a fourth mirror 13a for deflecting the measuring component 502. Further, a fourth beam-splitting prism 134 is further disposed between the second mirror 138 and the first remote coupler 135 to combine the light beams 503 and 506 and project the combined beams onto the first remote coupler 135.

The light source module 300 is connected to the grating measuring probe 100 by the polarization-maintaining fiber optics 401, 402, and the grating measuring probe 100 is connected to the first detector and the second detector (not shown) by multiple-mode fiber optics 403, 404.

Specifically, the HeNe laser in the light source module 300 emits a HeNe laser beam at a frequency $f_0$, passes through the isolator 302 and is split by the beam-splitting prism 303 into two beams directed respectively to the first frequency shifter 305 and the second frequency shifter 306. The first frequency shifter 305 shifts the frequency of the respective incoming beam by an amount of $\Delta f_1$ so that it exits at a frequency of $f_0+\Delta f_1$. The second frequency shifter 306 shifts the frequency of the respective incoming beam by an amount of $\Delta f_2$ so that it leaves at a frequency of $f_0+\Delta f_2$. These two beams are them coupled respectively by the first coupler 307 and the second coupler 308 to the polarization-maintaining fiber optic 401, 402 for remote transmission to the grating measuring probe 100.

The two beams at the frequencies of $f_0+\Delta f_1$ and $f_0+\Delta f_2$ are incident on the grating measuring probe 100. Hereinafter, for the purpose of discrimination, the beam at the frequency of $f_0+\Delta f_1$ is referred to as a measuring beam, and the beam at the frequency of $f_0+\Delta f_2$ as a reference beam. The measuring beam is collimated by the first collimator 111 and is angularly controlled by the pair of wedge-shaped plates 113. After that, it is split by the first beam-splitting prism 131 into two measuring components 501, 502. The measuring component 501 transmits through the polarization beam splitter 121 and its polarization is then rotated by 45 degrees at the polarization controller 123. Upon the polarization-modified beam incident on the grating 200, a diffraction takes place, and a resulting zeroth-order diffracted light beam 505 reaches the polarization controller 123, where its polarization is rotated by 45 degrees. As a result, its polarization is offset 90 degrees, compared to that of the beam prior to the original measuring component 505. Therefore, the diffracted light beam 505 is reflected by the polarization beam splitter 121 to the corner reflector 122 and then by the corner reflector 122 back to the polarization beam splitter 121. Subsequently, it is again incident on the grating 200 and diffracted thereby, resulting in a zeroth-order diffracted light beam 506. The zeroth-order diffracted light beam 506 is then successively deflected by the first and second mirror 137, 138, propagates through the fourth beam-splitting prism 134 and finally reaches the first remote coupler 135. The other measuring component 502 is reflected by the fourth mirror 13a, transmits through the third beam-splitting prism 133 and arrives at the second remote coupler 136.

The reference beam is collimated by the second collimator 112 and split by the second beam-splitting prism 132 into two reference components 503, 504. The reference component 503 is deflected at the third mirror 139 and passes through the fourth beam-splitting prism 134. It is then combined with the aforementioned zeroth-order diffracted light beam 506, and the combined beams are directed onto the first remote coupler 135. The other reference component 504 is combined with the other measuring component 502 by the third beam-splitting prism 133, and the combined beams are fed to the second remote coupler 136.

When a displacement of the grating 200 relative to the grating measuring probe 100 occurs in the Z (vertical) direction, the zeroth-order diffracted light beam 506 exiting the vertical measurement module will carry information about $f_0+\Delta f_1+\Delta Z$ (the displacement). After it is combined with the reference component 503, the first remote coupler 135 couples them together and thereby generates an interference signal indicating $(\Delta f_2-\Delta f_1-\Delta Z)$, which is then sent to the first detector via the multiple-mode fiber optic 403. Similarly, after the other measuring component 502 is combined with the other reference component 504, the second remote coupler 136 couples them together, thereby generating an interference signal indicative of $(\Delta f_2-\Delta f_1)$, which is then sent to the second detector via the multiple-mode fiber optic 404. Based on these signals received respectively at the first and second detectors, the signal processing module can derive the Z-directional displacement ΔZ of the grating 200 relative to the grating measuring probe 100, simply by determining the difference between $(\Delta f_2-\Delta f_1-\Delta Z)$ indicated by the interference signal from the first remote coupler 135, that contain the displacement, and $(\Delta f_2-\Delta f_1)$ indicated by the interference signal from the second remote coupler 136, that does not contain the displacement.

Embodiment 2

Figure 2:
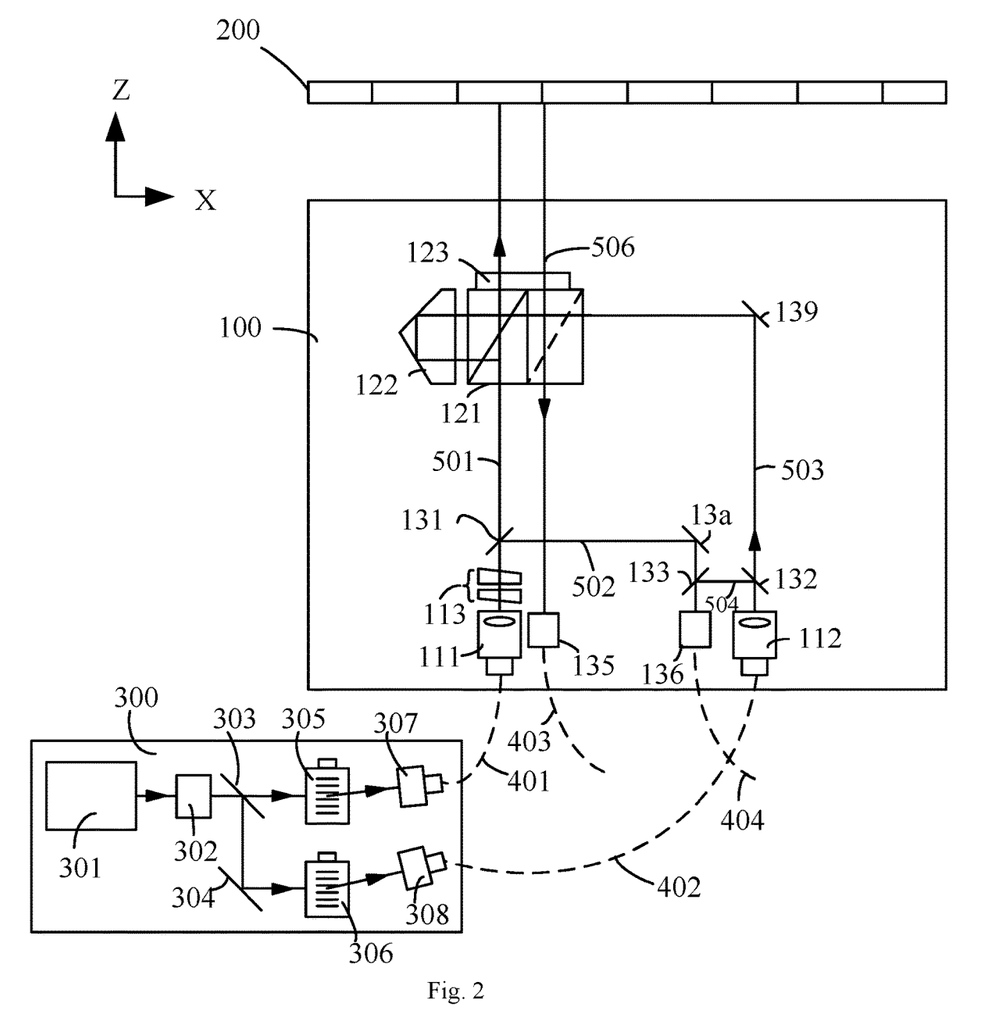
FIG. 2 is a structural schematic of a grating measuring device according to Embodiment 2 of the present invention.

This embodiment differs from Embodiment 1 in that the reference beam follows a different path.

As shown in FIG. 2, the first and second mirrors 137, 138 and the fourth beam-splitting prism 134 disposed upstream of the vertical detection module of the Embodiment 1 are omitted. Specifically, the reference beam is collimated by the second collimator 112 and split by the second beam-splitting prism 132 into two reference components. The reference component 503 is reflected by the third mirror 139 onto the polarization beam splitter 121 in the vertical measurement module, where it is combined with the zeroth-order diffracted beam 506 resulting from the second diffraction of the measuring component 501 at the grating 200, followed by reception of the combined beams at the first remote coupler 135. The other reference component 503 transmits through the third beam-splitting prism 133 and is then combined with the other measuring component 502, and the combined beams are incident on the second remote coupler 136. Reference can be made to FIG. 1 for details in the propagation of the measuring component 501 from the first beam-splitting prism 131 to the grating 200 where it is diffracted. The remainder of this embodiment and the operating principles thereof are the same as those of Embodiment and therefore not described here to avoid repetitions.

Embodiment 3

Figure 3:
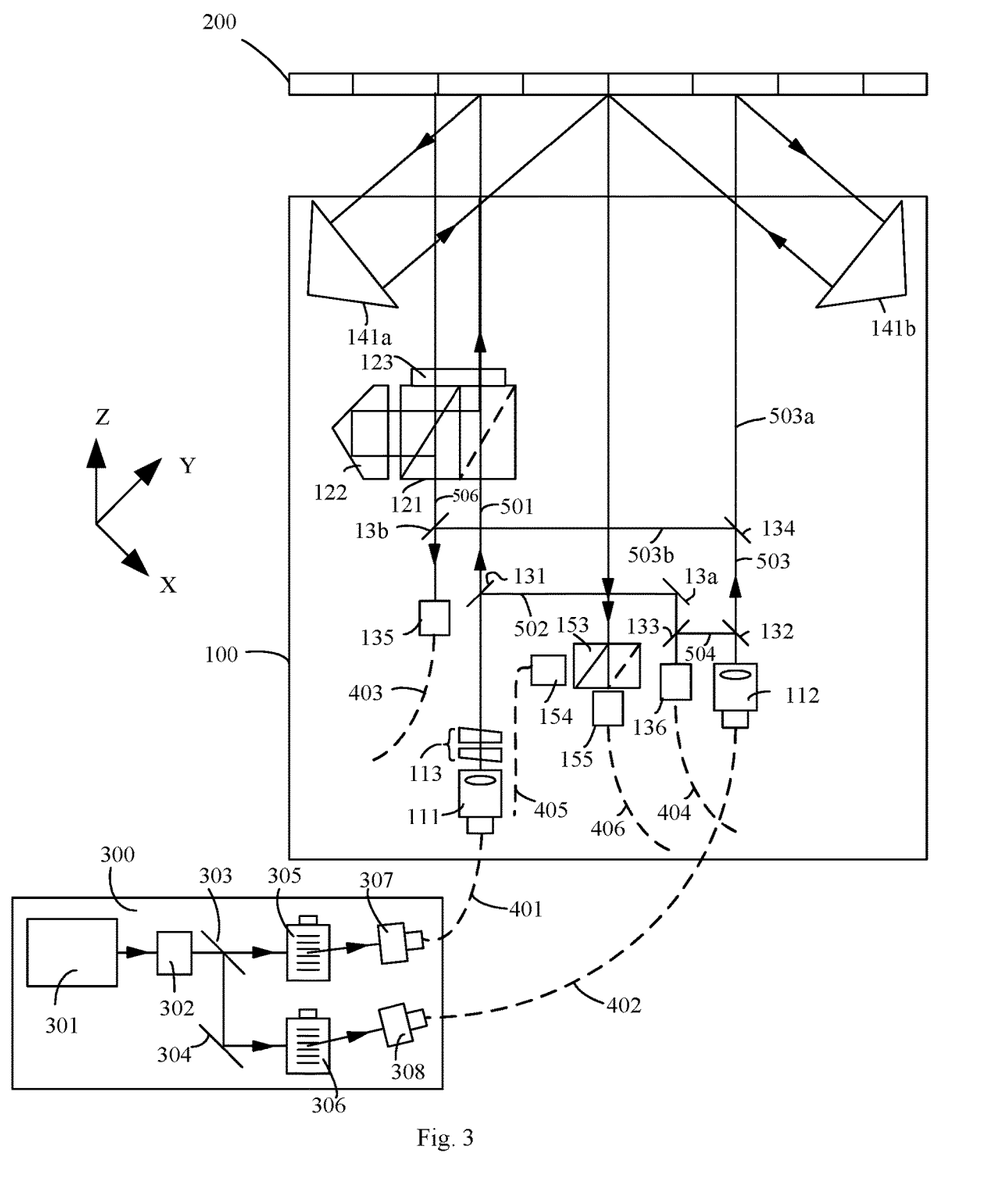
FIG. 3 is a structural schematic of a grating measuring device according to Embodiment 3 of the present invention.

This embodiment differs from Embodiments 1 and 2 in allowing the measurement of a horizontal displacement in addition to a vertical displacement.

As shown in FIG. 3, a grating measuring device according to this embodiment includes a light source module 300, a grating measuring probe 100, a grating 200 and a plurality of detectors (not shown) each coupled to the grating measuring probe 100. The light source module 300 inputs two light beams at different frequencies to the grating measuring probe 100 via polarization-maintaining fiber optics 401, 402, and the grating measuring probe 100 outputs X-, Y- and Z-direction position information and reference signals, derived from interactions of the beams with the grating 200, to the detectors via multiple-mode fiber optics 403-406.

As shown in FIG. 3, differing from Embodiment 1, a horizontal detection module and a horizontal measurement module are additionally included in accordance with this embodiment. The horizontal measurement module includes two first corner reflectors 141a, 141b, which are disposed in symmetry with each other. The first corner reflectors 141a, 141b are configured to respectively collect a plus-first-order diffracted beam and a minus-first-order diffracted beam resulting from a light beam diffracted at the grating 200 (the invention is not limited to using the plus- and minus-first-order light beams, because plus- and minus-second-order light beams or a combination of the first- and second order light beams may also be used). The plus- and minus-first-order diffracted beams are reflected and then directed again onto the grating 200 for a second diffraction. Light beams resulting from the second diffraction of the grating 200 are also collected by the horizontal detection module.

The horizontal detection module includes a first polarization beam splitter 153, a third remote coupler 154 and a fourth remote coupler 155.

Specifically, the measuring beam is split by the first beam-splitting prism 131 into two measuring components. The measuring component 501 is guided by the vertical measurement module onto the surface of the grating 200, where it is reflected and diffracted. The resulting diffracted light beams pass through the first polarization beam splitter 153 and respectively arrive at the third and fourth remote couplers 154, 155. The other measuring component 502 is fed to the second remote coupler 136 as a reference signal.

The reference beam is split by the second beam-splitting prism 132 into two reference components. The reference component 503 is projected onto the grating 200 and diffracted by the grating 200, and the resulting diffracted light beams are directed onto the third and fourth remote coupler 154, 155 by the first polarization beam splitter 153. The other reference component 504 is fed to the second remote coupler 136 as a reference signal.

Figure 4:
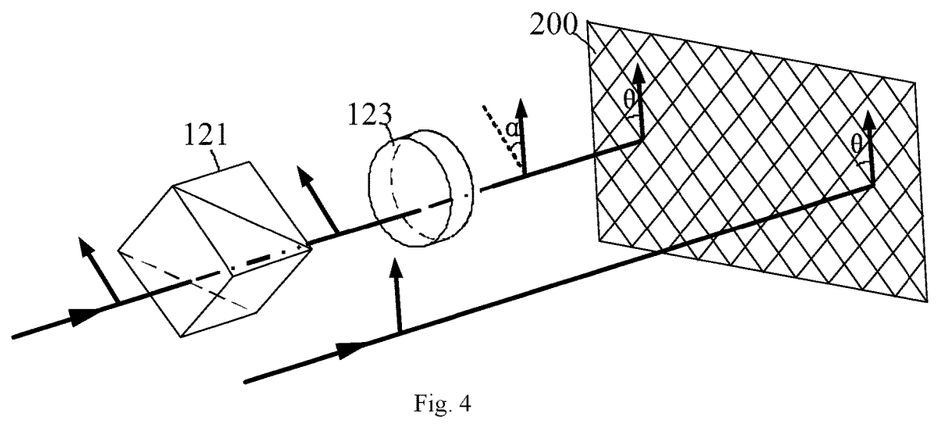
FIG. 4 shows how the polarization of a light beam varies during its propagation through a vertical measurement module in accordance with Embodiment 3 of the present invention.

Specifically, the light source module 300 emits two beams respectively at frequencies of $f_0+\Delta f_1$ and $f_0+\Delta f_2$. Hereinafter, for the purpose of discrimination, the beam at the frequency of $f_0+\Delta f_1$ is referred to as a measuring beam, and the one at the frequency of $f_0+\Delta f_2$ as a reference beam. FIG. 4 shows how the polarization of the measuring beam varies during its propagation through the vertical measurement module. The polarization of the measuring beam is oriented at an angle α with respect to that of the reference beam. Accordingly, the polarization beam splitter 121 is placed obliquely at the angle α. In this way, the measuring beam passes through the polarization beam splitter 121 without experience any change in polarization, and the polarization controller 123 then rotates its polarization by the angle α. At this point, the polarization of the measuring beam is identical to that of the reference beam. That is, their polarizations are both offset by an angle of θ with respect to the direction of periodicity of the grating 200. Of course, the measuring and reference beams are both normally incident on the surface of the grating 200. In this embodiment, the angle α is 45 degrees.

Specifically, the measuring beam is modulated by the dual-frequency light reception module and then split by the first beam-splitting prism 131 into two measuring components. The measuring component 501 is guided by the vertical measurement module onto the surface of the grating 200 for diffraction. A minus-first-order light beam resulting from the diffraction is split by the first polarization beam splitter 153 into component beams which are respectively fed to the third and fourth remote couplers 154, 155. The other measuring component 502 is directed to the second remote coupler 136. A zeroth-order diffracted light beam resulting from the diffraction at the grating 200 is rotated in polarization by the polarization controller 123, reflected by the polarization beam splitter 121 onto the corner reflector 122, reflected by the corner reflector 122 back to the polarization beam splitter 121 and irradiated again onto the grating 200, resulting a zeroth-order diffracted beam 506 which is reflected by the beam-splitting prism 13b onto the first remote coupler 135.

The reference beam is split by the second beam-splitting prism 132 into two reference components. The reference component 503 is then further split by the fourth beam-splitting prism 134 into two reference sub-component 503a, 503b. The reference sub-component 503a is guided onto the surface of the grating 200 for diffraction. A plus-first-order light beam resulting from the diffraction is fed by the first polarization beam splitter 153 respectively to the third and fourth remote coupler 154 and 155. The reference sub-component 503b is directed by the beam-splitting prism 13b onto the first remote coupler 135. The other reference component 504 is directed by the third beam-splitting prism 133 onto the second remote coupler 136. Further, the beam splitting direction of the first polarization beam splitter 153 is identical to the direction of periodicity of the grating 200.

When the grating 200 is displaced by ΔX in the X-direction, the third remote coupler 154 will generate an interference signal indicative of an amount containing the displacement ΔX and corresponding to an interference fringe count N1:

$$N1=[(f_0+\Delta f_2)T_1+2\Delta X/d]-[(f_0+\Delta f_1)T_1-2\Delta X/d]=(\Delta f_2-\Delta f_1)T_1+4\Delta X/d \quad (1)$$

where $T_1$ represents the length of time for the displacement ΔX, and d denotes a pitch of the grating 200. Diffracted twice at the grating 200, the light beam at the frequency of $f_0+\Delta f_1$ is shifted in frequency by $-2\Delta X/d$ with respect to its final minus-first-order diffracted beam. Likewise, also diffracted twice at the grating 200, the light beam at the frequency of $f_0+\Delta f_2$ is shifted in frequency by $+2\Delta X/d$ relative to its final plus-first-order diffracted beam.

The second remote coupler 136 generates a reference signal indicative of an amount not containing the displacement ΔX and corresponding to an interference fringe count N2:

$$N2=(f_0+\Delta f_2)T_1-(f_0+\Delta f_1)T_1=(\Delta f_2-\Delta f_1)T_1 \quad (2)$$

Therefore, the displacement ΔX of the grating 200 relative to the grating measuring probe 100 in the X-direction can be obtained as the difference between the above two interference fringe counts:

$$\Delta X=d(N1-N2)/4 \quad (3)$$

When the grating 200 is displaced by ΔY in the Y-direction, the fourth remote coupler 155 will generate an interference signal indicating an amount containing the displacement ΔY and corresponding to an interference fringe count N3:

$$N3=[(f_0+\Delta f_2)T_2+2\Delta Y/d]-[(f_0+\Delta f_1)T_2-2\Delta Y/d]=(\Delta f_2-\Delta f_1)T_2+4\Delta Y/d \quad (4)$$

where $T_2$ represents the length of time for the displacement ΔY, and d denotes the pitch of the grating 200. Diffracted twice at the grating 200, the light beam at the frequency of $f_0+\Delta f_1$ is shifted in frequency by $-2\Delta Y/d$ with respect to its final minus-first-order diffracted beam. Likewise, also diffracted twice at the grating 200, the light beam at the frequency of $f_0+\Delta f_2$ is shifted in frequency by $+2\Delta Y/d$ relative to its final plus-first-order diffracted beam.

The displacement ΔY of the grating 200 relative to the grating measuring probe 100 in the Y-direction based on the interference fringe counts N2 and N3 according to:

$$\Delta Y=d(N3-N2)/4.$$

It is to be noted that light spot formation occurs in the grating measuring probe 100 in a direction that is inclined at an angle of θ with respect to the direction of periodicity of the grating 200, where θ may be any value within 0 to 3600 or 0 to any multiple of 360° in order to allow position measurement in the X- and/or Y-direction(s). When the angle is equal to 0°, 90°, 180°, 360° or any other multiple of 90°, one-dimensional horizontal position measurement of the grating 200 in the X- or Y-direction is possible. Otherwise, when the angle is not equal to 0°, 90°, 180°, 360° and any other multiple of 90°, two-dimensional horizontal position measurement of the grating 200 in the X and/or Y-direction(s) is enabled. In particular, when the angle is equal to 45°, 135° or (45+k*90)° (k is a natural number), the X- and Y-directions of the grating measuring probe 100 will be symmetric to each other with respect to the direction of periodicity of the grating 200. In this case, the energy of an optical signal will be distributed evenly both in the X- and Y-directions, which will result in better two-dimensional horizontal position measurement results.

According to the present invention, two or more polarized light beams at different frequencies can be employed to measure displacement(s) of the grating in the X- and/or Y- and/or Z-direction(s). In addition, a multi-axis scheme capable of measurement in additional direction(s) such as Rx and/or Ry and/or Rz with higher measurement sensitivity and reduced measurement errors can be obtained by incorporating auxiliary or other correction means. The present invention can be used in feedback systems for ultra-high-precision multi-DOF motion control of wafer and mask stages in step-and-expose or step-and-scan lithography equipment or in other high-precision measurement applications such as measurement and feedback control of motion components in measuring apparatus using laser, X-ray or ion beams.

It is apparent that those skilled in the art can make various modifications and variations to the present invention without departing from the spirit and scope thereof. Accordingly, the invention is intended to embrace all such modifications and variations if they fall within the scope of the appended claims and equivalents thereof.

What is claimed is:

1. A grating measuring device for measuring a displacement of a grating, comprising:
   a light source module for generating two light beams having different frequencies, one of the two light beams serving as a measuring beam and the other one serving as a reference beam;
   a grating measuring probe comprising a dual-frequency light reception module, a vertical measurement module, a vertical detection module and a reference detection module, wherein the dual-frequency light reception module is configured to receive the measuring beam and the reference beam, project the measuring beam onto the vertical measurement module and the reference detection module, and project the reference beam onto the vertical detection module and the reference detection module, wherein the vertical measurement module projects the measuring beam onto the grating, collects a zeroth-order diffracted beam resulting from double diffraction at the grating, and projects the zeroth-order diffracted beam to the vertical detection module, wherein the zeroth-order diffracted beam interferes with the reference beam in the vertical detection module, thereby forming a vertical interference signal, and wherein the measuring beam interferes with the reference beam in the reference detection module, thereby forming a reference interference signal; and
   a signal processing module configured to receive the vertical interference signal and the reference interference signal and calculate a vertical displacement of the grating.

2. The grating measuring device of claim 1, wherein the light source module comprises a laser, an isolator, a beam-splitter, frequency shifters, a first coupler and a second coupler, and wherein a laser beam emanated from the laser passes through the isolator and is split by the beam-splitter into two beams which are then modified by the frequency shifters to have different frequencies, the two beams being respectively coupled by the first and second couplers and fed to the grating measuring probe.

3. The grating measuring device of claim 2, wherein the laser beam emanated from the laser has a wavelength of 400-1500 nm.

4. The grating measuring device of claim 2, wherein each of the frequency shifters is a Zeeman frequency splitting element, a birefringent element or two acousto-optic frequency shifters.

5. The grating measuring device of claim 1, wherein the grating is a one-dimensional grating or a two-dimensional grating.

6. The grating measuring device of claim 1, wherein the vertical measurement module comprises a polarization beam splitter, a corner reflector and a polarization controller, wherein after transmitting through the polarization beam splitter, the measuring beam is rotated in polarization by the polarization controller and diffracted at the grating, wherein a zeroth-order diffracted beam resulting from the diffraction is rotated in polarization again by the polarization controller, reflected by the polarization beam splitter, reflected by the corner reflector back to the polarization beam splitter and irradiated onto the grating so that a second diffraction takes place, and wherein a zeroth-order diffracted beam resulting from the second diffraction passes through the polarization beam splitter and finally reaches the vertical detection module.

7. The grating measuring device of claim 6, wherein the polarization controller is a Faraday rotator or a half wave plate.

8. The grating measuring device of claim 1, wherein the dual-frequency light reception module comprises a first beam-splitting prism and a second beam-splitting prism, wherein the vertical detection module comprises a vertical measurement coupler, wherein the measuring beam is split by the first beam-splitting prism into a first measuring component and a second measuring component, the first measuring component being projected onto the grating by the vertical measurement module, the second measuring component being projected to the reference detection module, and wherein the reference beam is split by the second beam-splitting prism into a first reference component and a second reference component, the first reference component being coupled by the vertical measurement coupler with a light beam resulting from the first measuring component that has passed through the vertical measurement module, the second reference component being projected to the reference detection module.

9. The grating measuring device of claim 1, wherein the dual-frequency light reception module comprises a first beam-splitting prism and a second beam-splitting prism, wherein the vertical detection module comprises a vertical measurement coupler and a third beam-splitting prism, wherein the measuring beam is split by the first beam-splitting prism into a first measuring component and a second measuring component, the first measuring component being projected to the grating by the vertical measurement module, the second measuring component being projected to the reference detection module, wherein the reference beam is split by the second beam-splitting prism into a first reference component and a second reference component, the first reference component passing through the third beam-splitting prism and being then coupled by the vertical measurement coupler with a light beam resulting from the first measuring component that has passed through the vertical measurement module, the second reference component being projected to the reference detection module.

10. The grating measuring device of claim 8, further comprising a plurality of reflective components for deflecting and relaying the light beams.

11. The grating measuring device of claim 1, wherein the dual-frequency light reception module further comprise a first collimator, a second collimator and a pair of wedge-shaped plates, wherein the measuring beam is collimated and angularly controlled by the first collimator and the pair of wedge-shaped plates, and wherein the reference beam is collimated by the second collimator.

12. The grating measuring device of claim 1, wherein the light source module is connected to the grating measuring probe by polarization-maintaining fiber optics.

13. The grating measuring device of claim 6, wherein the polarization of the measuring beam is oriented at a first angle with respect to that of the reference beam, and wherein accordingly, the polarization beam splitter is placed obliquely at the first angle and the polarization controller rotates the polarizations of the light beams by the first angle.

14. The grating measuring device of claim 13, wherein the first angle is 45 degrees.

15. The grating measuring device of claim 1, wherein the polarization of the light beam incident on a surface of the grating is oriented at a second angle with respect to a direction of periodicity of the grating.

16. The grating measuring device of claim 15, wherein the second angle is (45+k*90) degrees, where k is a natural number.

17. The grating measuring device of claim 1, wherein the vertical detection module is connected to the signal processing module by a multiple-mode fiber optic.

18. The grating measuring device of claim 1, wherein the reference detection module is connected to the signal processing module by a multiple-mode fiber optic.

* * * * *